(12) United States Patent
Taillade et al.

(10) Patent No.: US 6,465,027 B1
(45) Date of Patent: Oct. 15, 2002

(54) READY-TO-USE LONG CONSERVATION BAKER'S LEAVEN

(75) Inventors: Patrick Taillade, Mouvaux (FR); Pascal Lejeune, Lille (FR); Emilie Bryckaert, Marcq en Baroeul (FR); Didier Colavizza, Conde sur Escaut (FR)

(73) Assignee: LESAFFRE et Cie, Paris (FR)

( * ) Notice: Subject to any disclaimer, the term of this patent is extended or adjusted under 35 U.S.C. 154(b) by 0 days.

(21) Appl. No.: 09/292,252

(22) Filed: Apr. 15, 1999

(30) Foreign Application Priority Data

Apr. 15, 1998 (FR) .............................. 98 04701

(51) Int. Cl.⁷ ................................. A21D 2/08
(52) U.S. Cl. .......................................... 426/61; 426/62
(58) Field of Search .............................. 426/61, 62, 64, 426/18, 19, 20, 21, 25, 27, 28, 549, 551, 555, 622, 626, 496

(56) References Cited

U.S. PATENT DOCUMENTS

| 4,243,687 A | * | 1/1981 | Kline | 426/62 |
| 4,666,719 A | | 5/1987 | Spiller | 426/18 |
| 5,500,231 A | * | 3/1996 | Buensow et al. | 426/18 |
| 5,700,684 A | * | 12/1997 | Ehret | 435/255.2 |
| 5,723,161 A | * | 3/1998 | Buensow et al. | 426/18 |
| 6,013,294 A | * | 1/2000 | Bunke et al. | 426/120 |

FOREIGN PATENT DOCUMENTS

| EP | 0 078 182 | 10/1982 |
| EP | 0 684 306 | 5/1994 |
| EP | 0 684 307 | 5/1994 |
| EP | 0 684 308 | 5/1994 |
| EP | 0 636 692 | 7/1994 |
| EP | 0 806 144 | 5/1997 |
| FR | 82 07047 | 4/1982 |
| GB | 993 751 | 10/1962 |

* cited by examiner

Primary Examiner—Keith Hendricks
(74) Attorney, Agent, or Firm—Henderson & Sturm LLP

(57) ABSTRACT

The present invention relates to a baker's leaven ready-to-use comprising at least one non malted grain flour, water and at least one preparation of heterofermentative lactic bacteria, said baker's leaven, whose dry matter content is from 12 to 50%, whose pH is from 4 to 4.3, and which provides at least 1 billion of revivable lactic bacteria per gram during at least 4 weeks, provided it is preserved at a temperature lower than 10° C., being capable, after the said preservation or conservation, to ferment a baker's dough in accordance with a direct process for the production of leavened bread.

48 Claims, No Drawings

READY-TO-USE LONG CONSERVATION BAKER'S LEAVEN

FIELD OF THE INVENTION

The invention relates to a baker's leaven or sourdough which retains, during several weeks, at low temperature, all its properties for the fermentation of the dough of a leavened bread or sourdough bread; it also relates to a process for the making of said baker's leaven or sourdough.

DESCRIPTION OF THE RELATED ART

It is well known that, in order to conserve the characteristic features of a natural or traditional leaven, it is absolutely necessary to carry out every day several so-called refreshments which render tedious the work of the bakers. By way of example, it is possible to remember that Parmentier, in 1778 in his book "Le Parfait Boulanger" already underlined "the laborious slavery of the bakers to watch out day and night for what happens in their leavens, and the continuous constraint to refresh them three or four times, which leaves to that class of artists at most three hours to rest."

A refreshment corresponds to a new addition of flour and of water to the leaven, addition which corresponds on the one hand to a dilution of the fermentation medium and, on the other hand, to an addition of fermentable substances. In order to reduce the number of the necessary refreshments and to achieve the result consisting in the fact that every day the quantities of leaven which must be taken off for breadmaking, are equivalent to the additions of flour and of water which are necessary for the maintenance of the leaven, it has been proposed to use equipments often called "fermentation devices for liquid leaven". By way of these equipments, it becomes possible to control the temperatures and to use low temperature conservation phases. These systems, which are called "continuous", are particularly difficult and tricky to run.

The British patent GB 993 751 discloses a process of this kind which consists in providing the leaven, so-called pre-dough, with the necessary additional amounts of its components and in achieving the simultaneous removal or withdrawal of the fermented leaven ready-to-use in breadmaking or panification.

A problem not solved to date is how to provide the baker with a ready-to-use leaven, in other words a leaven called "tout point" ("any point") according to the French traditional terminology, which can be conserved without any intervention at low temperature during several weeks and without loss of its characteristic features.

It is known that bread-making or panification with leaven permits the obtaining of:

an appreciated particular flavor which is especially characterized by a sourish or acetic smell of the crumb;

a bread having a particular texture;

a bread which keeps longer.

These characteristic features of flavor and of texture are the result of the fermentation under the action of the bacteria and of the yeasts of the leaven. Due to these characteristic features, leavened bread or sourdough bread is a bread in great demand with the consumer.

The baking methods which use a leaven prepared by the known techniques present two major drawbacks:

the difficulty to prepare a leaven having identical features at each bread-making, even when using the systems of fermentation which are called "continuous" and which comprise successive or continuous additions and removals or withdrawals, the short life expectancy of that leaven, even at low temperature; as a matter of fact, in the absence of any refreshment, a too important acidification develops and provokes more or less rapidly in the leaven the disappearance of viable microorganisms, in other words of microorganisms which are capable of multiplication or of fermentation.

In order to remedy the first drawback, the profession has used various techniques among which is the preparation of the leaven in a single step by way of dry concentrates of microorganisms called "starters", such as the ferments for panification disclosed in the European patent application EP 0 306 692 A1. These microorganism concentrates or starters can equally be presented in a doughy form. The conservation improvement is sought by the increase of dry matters to about 60–80% dry matters of the microorganism culture, without freeze-drying. This doughy form is often obtained by the use of a grain or cereal carrier like in the case of German starter of trademark Bocker Reinzucht-Sauerteig®. These starters are used to seed doughs and permit to obtain a ready-to-use leaven after a fermentation of 15 to 22 hours between 20 to 30° C. These leavens obtained by their seeding with the above defined starters permit to obtain good leaven breads, but these leavens cannot be kept. Either they are used as chief leaven or mother sourdough kept by regular refreshments, or a new leaven must be prepared by seeding a dough with starter for each breadmaking.

Starters can equally be presented in liquid form, i.e. as liquid grain or cereal ferments or suspensions of microorganisms. Such grain ferments are for example disclosed in the French patent FR 82 07047.

These grain ferments which are composed of the association of a Lactobacillus strain and a yeast strain, are cultivated in conjunction in an aqueous medium based on wheat flour; that wheat flour, the starch of which is hydrolyzed, is diluted with about 7 to 10 times its volume of water. These liquid cereal ferments consist of suspensions of microorganisms or microorganism cultures intended to seed the leaven, they conserve their viability at most 3 weeks at 4° C.

An embodiment of that technique is disclosed in patent applications EP 0 684 306 A1, EP 0 684 307 A1, EP 0 684 308 A1, EP 0 806 144 A2; according to that embodiment, the microorganisms are cultivated in a medium obtained by double hydrolysis, within a diluted aqueous mixture, of the starch on the one hand and of a portion of the gluten or more generally of the proteins of the flour(s) used on the other hand.

With respect to the second drawback, it should be remembered that the traditional conservation methods such as freezing and above all drying are not very successful due to the fact that the microorganisms suffer due to the conservation treatment from a more or less important disorganization of their membranes. During the defrosting or the rehydration, the said microorganisms have to reconstitute their membranes and to resume their metabolic activity in the presence of the important quantities of metabolites produced by them, said metabolites being all the more toxic as the cells have been made fragile by the conservation treatment. The dehydrated or dry leavens are in fact dead leavens and their only role is to provide aromatic molecules.

All known preparations of ready-to-use leavens produced in advance, in the absence of refreshments, within a few days and even at 4° C., correspond to preparations which are extremely rich in acids and which practically no longer contain any revivable or revitalizable microorganism, these preparations being unable to ensure the fermentation of the dough of a leavened bread.

Consequently, these solutions proposed to improve the conservation of leaven are not very different as far as their result is concerned from the use of leaven substitutes or dehydrated deactivated prefermented flours, whose unique role is to provide the dough during the kneading with acetic acid and with lactic acid. The breads obtained when using these products which practically do not contain revivable microorganisms,. do not present, of course, in any case, the characteristic texture and the complete flavor of a leavened bread at the moment of their consumption.

It is remarkable that in the documents which deal with the conservation of leavens, no difference is made between, on the one hand, the addition to bread dough of acetic acid, lactic acid and in a general manner of aromatic molecules and, on the other hand, the addition of microorganisms which are capable if fermenting the dough. No control of viable microorganisms present after conservation is made.

That is the case especially of U.S. Pat. No. 4,666,719 which does not contain any indication of prolonged viability of the cultures or of the leavens which are conserved. It is besides important to notice that, in that U.S. patent, the breadmaking process which is used in connection with the leaven, object of the said patent, is a short process comprising a total fermentation time between the beginning of the kneading step and the baking step of less than 3 hours. Such a process is too short for a significant participation of the microorganisms of a leaven in the raising of the dough; consequently, such a process cannot be contemplated without the addition of a high dose of baker's yeast.

BRIEF SUMMARY OF THE INVENTION

The present invention intends, by way of the composition of the leaven which is its object, and especially by way of the final characteristic features of the said leaven, to naturally stabilize, during at least 4 weeks, and up to 8 weeks or more, under classic conservation conditions (temperature lower than 10° C., preferably between 0 and 4° C.) not only the microbial populations but also the physico-chemical characteristic features of the leaven while permitting the use of the said leaven as fermentation agent for the fermentation and the raising of the baker's dough, directly at the moment of kneading during the manufacture of a leavened bread, within the frame of a direct manufacture process, that is to say a process which comprises one single kneading step.

DETAILED DESCRIPTION OF THE INVENTION

The stable and ready-to-use baker's leaven or sourdough according to the invention is obtained by the use:
 a) of at least one non malted grain flour (=cereal flour),
 b) preferably additionally of at least either one malted grain flour providing amylases, or any equivalent other source of amylases,
 c) of water, which can be provided by the preparations of microorganisms,
 d) of a seeding with at least either one heterofermentative lactic bacteria preparation, or preferably with at least one heterofermentative lactic bacteria preparation and at least one yeast preparation, it being possible that these seedings are complemented by at least one further seeding with a homofermentative lactic bacteria preparation.

The stable leaven according to the invention is characterized by the fact that it has a pH comprised between 4 and 4.3, that it provides at least 1 milliard (=billion) of revitalizable (or revivable, or viable) lactic bacteria per gram and, preferably, at least one million and, still more preferably, at least 5 millions of revivable yeasts per gram, during at least 4 weeks, provided it is conserved at a temperature of less than 10° C., preferably of less than 4° C. and that, by way of consequence, during the said period of conservation of at least 4 weeks, it permits the fermentation of a baker's dough according to a direct process for the obtention of leavened bread.

Advantageously, the baker's leaven according to the invention presents, without freezing, a conservation of at least 6 weeks at 4° C., and preferably of at least 2 months at 4° C. or an analogous conservation determined according to any equivalent time/temperature schedule.

The leavens obtained according to the present invention are consistent with the French regulation. The thus manufactured leavens enable a great number of uses from the direct short breadmaking process wherein the fermentation is relatively short to the direct long processes having a long fermentation duration and which are typical of leavened breads, it being recalled that a long process is a process whose duration between the beginning of the kneading and the end of the baking is of at least 6 hours at ambient temperature under a moderate climate.

This latter use is recommended because it permits the flora of the leaven, which is maintained alive due to the invention, to be fully expressed and to synthetize within the dough a group of complex molecules which generate, during fermentation and at the moment of baking, the characteristic smell, flavor and texture of leavened breads.

Preferably, the leaven according to the invention comprises a malted grain flour which provides a complement of amylases and of fermentable sugars.

The amylases and the fermentable sugars may however be provided in different ways.

The grain flours are themselves a source of fermentable sugars and of amylases. In the case of shortage of amylases, the addition of exogenous amylases, for instance of fungal amylases, can be contemplated.

The dough of the leaven is fermented until depletion of the fermentable sugars. Supervision is carried out in order to ensure that the leaven contains sufficient amylases for the degradation of the totality of the degradable starch under the action of the said enzymes, essentially into maltose and also into glucose within a duration which is compatible with the control of the method.

The degradable starch comes in principle essentially from the damaged starch grains during the grinding or milling of grains into flour, it being recalled that the intact starch grains are, in principle, not attackable by the enzymes of the flour or by fungal amylases.

In other words, the only object of that addition of amylases is to degrade the starch which is present and which is easily attackable by the amylases within the frame of a bread fermentation; its object is however, in no case, to lead to a quasi complete hydrolysis of the starch as in the processes disclosed in the French patent FR 82 07047 or in the European patent application EP 0 806 144 A2 already mentioned. These prior art processes further comprise generally a pregelatinization step of the starch (treatment generally at a temperature higher than 60° C.) in such a way that the said starch becomes completely attachable, this step being omitted within the frame of the realization of the leaven phase of the present invention.

The characteristic features of the leaven according to the invention consist of the fact that:

its pH is controlled and does not drop below 4, preferably not below 4.1 and, still more preferably, not below 4.2, during the whole duration of the conservation;

the total amounts of fermentable sugars introduced directly or indirectly as well during the preparations of microorganisms as during the leaven phase are such that the amounts of lactic acid and of acetic acid which are produced remain controlled and do not exceed these amounts of lactic and acetic acids which are compatible with the conservation of the leaven at the required pH;

preferably, at the end of the leaven phase, the available amount of fermentable sugars is lower than 1 per 1000 and remains lower than 1 per 1000 during the whole conservation.

According to an advantageous embodiment, the dry matter content of the leaven is from 12 to 50% by weight, preferably comprised between 12 and 35% and, still more preferably, between 13 and 20%; it is advantageously higher than 15%.

According to an advantageous characteristic feature, the lactic acid content of the leaven is from 10 to 50 g per kg of leaven, preferably comprised between 10 and 30 g/kg and, still more preferably, between 15 and 30 g/kg, while the acetic acid content is advantageously more than 2 grams per kg of leaven, preferably comprised between 7 and 15 g/kg, more preferably between 7 and 12 g/kg and still more preferably between 6 and 10 g/kg. The total amount of the two acids is not higher than 52 g/kg; preferably, it is less than 40 g/kg.

According to another advantageous characteristic feature, the ratio of acetic and of lactic acids in the mixture is at least equal to 30%; in other words, the ratio of acetic acid by weight with respect to lactic acid by weight is at least equal to 30%, provided that the total amount of lactic acid is not higher than 30 g/kg.

The whole of these characteristic features of the ready-to-use leaven or leaven "tout point" are selected in order:

on the one hand, to ensure the conservation of the leaven, that is to say first the conservation of a living biomass comprising at least $1.10^9$ lactic bacteria at the end of the term of the conservation of the leaven, on the other hand, to permit, even after its conservation, the fermentation and the making of a leavened bread appreciated by the consumer.

The research work carried out in connection with the invention has shown that the conservation of the leaven depends on its pH, on the amount of lactic acid, on the amount of acetic acid and, also, to a lesser extent, on the amount of alcohol.

Only the non-dissociated forms (that is to say non ionized forms) of organic acids are capable of passing through the cellular membrane of the microorganisms; consequently, these non-dissociated forms are the most toxic.

The equilibrium between the non dissociated form and the ionized form of the organic acids depends on their pH and on their pKa, the pKa being the pH at which each of the two forms of a pure acid represents 50% of the whole.

The pKa of lactic acid is 3.08 and that of acetic acid is 4.75. The higher the pH, the more the organic acids are in the dissociated form.

Generally, the higher its pH, the better is the conservation of the leaven.

Tests which were carried out have shown that below pH 4, it is impossible to contemplate the conservation of a viable biomass of bacteria and of yeasts without significant losses.

On the contrary, the maximum value of the pH which is equal to 4.3 was selected so as not to lead to an exaggerated consumption of NaOH or of any other equivalent base such as KOH within the frame of the process.

Furthermore, the conservation of the biomass depends on the total amount of the lactic and of the acetic acid produced, it being understood that it is the acetic acid which is the most toxic, taking into consideration the fact that at a pH of 4.3 it is mainly in a non-dissociated form, contrarily to the lactic acid which is to a great extent dissociated at that pH.

Taking into account this remark, it is necessary that:

the sum of the two acids in the leaven according to the invention which is a ready-to-use leaven, does not exceed 52 g/kg; preferably, it is equal to or lower than 40 g/kg, or preferably equal to or lower than 35 g/kg, and still more preferably equal to or lower than 30 g/kg, within the leaven, a high amount of total acids, that is to say an amount equal to or higher than 35 g/kg, is associated:

with a pH of the ready-to-use leaven adjusted to 4.2, preferably to 4.3 with an acetic acid content equal to or lower than 12 g/kg and preferably equal to or lower than 10 g/kg with an alcohol content equal to or lower than 15 g/kg and preferably equal to or lower than 10 g/kg still within the leaven, an amount equal to or higher than 10 g/kg of acetic acid is associated:

with a pH of the ready-to-use leaven adjusted to 4.2, preferably to 4.3 with a total content of acetic acid +lactic acid equal to or lower than 40 g/kg, preferably equal to or lower than 35 g/kg, or still preferably equal to or lower than 30 g/kg with an alcohol content equal to or lower than 15 g/kg, preferably equal to or lower than 10 g/kg.

The control of the production of organic acids is experimentally obtained by the control of the available fermentable sugars. It essentially depends:

on the amount of fermentable sugars introduced during the multiplications of lactic bacteria, on the amount of degradable starch, degradable essentially into maltose or also into glucose, present in the different flours, said amount of degradable starch depending especially on the amount of damaged starch grains.

Preferably, there is an excess of amylases at the starting point of the leaven phase in order to ensure that the totality of the fermentable sugars of the flours can be released during that leaven phase and that the residual release of the fermentable sugars during conservation is minimal, it being noted that this evolution can be followed by titration of the residual traces of the fermentable sugars, the amount of which shall be permanently lower than 1 per 1000.

Advantageously, the baker's leaven according to the invention is characterized by the fact that it contains:

from 15 to 30 g/kg of lactic acid from 7 to 12 g/kg of acetic acid, preferably from 6 to 10 g/kg.

A baker's leaven according to the invention containing at most 35 g/kg of organic acids is generally a leaven which has been obtained using a concentration technique at the end of the leaven phase.

The production of alcohol is also to be controlled, and the amount of alcohol should preferably not exceed 20 g/kg in the leaven, should more preferably not exceed 15 g/kg, and should still more preferably not exceed 10 g/kg.

The production of alcohol is controlled, on the one hand, by the addition of substrates which is limited as hereabove defined and, on the other hand, by the selection of the strains of heterofermentative bacteria and yeasts, and possibly also by the selection of the moment of the addition of the different biomasses to the leaven.

According to a particular feature of a leaven according to the invention, the latter is seeded with a preparation of yeasts which are not capable of fermenting maltose. In particular, the leaven is seeded with a strain of yeast pertaining to the sub-species *Saccharomyces cervisiae ssp chevalieri*.

The selection of a strain of yeast which does not ferment maltose permits the limitation of the production of alcohol and promotes the metabolism of the bacteria during the leaven phase during which maltose is the principal available fermentable sugar.

The formation of maltose within the leaven is due to the attack by amylases of the damaged starch grains of the flours.

According to a particular feature of a leaven according to the invention, the latter is seeded with a preparation of heterofermentative lactic bacteria pertaining to the species Lactobacillus or Leuconostoc or Pediococcus; more particularly, the said leaven is seeded with a strain of the species *Lactobacillus brevis*.

According to another particular feature of the leaven according to the invention, the latter is seeded with a preparation of heterofermentative bacteria as hereabove defined, possibly with a preparation of yeasts as hereabove defined, and additionally with a preparation of homofermentative lactic bacteria; the latter preferably belonging to the group of *Lactobacillus plantarum* and *Lactobacillus casel* species.

The preparations of lactic bacteria are produced in sterile fermentors and under sterile fermentation conditions by cultures within a classic synthetic medium at a pH equal to or higher than 5, preferably at pH 6.

A basic handbook concerning lactic bacteria and especially their classification, their metabolism and their preparation is the 2-volume handbook "Bactéries lactiques", editors H. ROISSART and F. M. LUQUET, Edition Lorica, January 1994, reference ISBN 2-9507477-0-1.

Among the species under consideration, the strains of lactic bacteria and of yeasts are selected in such a way that they allow an industrial multiplication and that they are as much as possible resistant to the stress built up by the metabolites produced by them. A great number of strains corresponding to these characteristic features have been disclosed and/or can be found in the public collection centers.

The preparation of the yeasts is carried out using conventional means, preferably in a synthetic medium based on glucose if the culture medium is not separated from the biomass of yeast at the end of production. "Yeast Technology", G. REED and T. W. NAGODAWITHANA, AVI BOOK (Van Nostrand Reinhold), 1991 is a work of reference concerning yeasts.

The thus obtained liquid preparations of microorganisms are used for seeding the mixture of non malted flour(s), of malted flour and of water in order to constitute the leaven, said seedings being conducted in order to obtain the above-defined characteristic features.

The seedings with each of the said preparations of microorganisms can be carried out at intervals in order to promote production of one or another metabolite, or to reduce competition between the different microorganisms.

The process according to the invention comprises advantageously an aerobic fermentation of xylose or an anaerobic fermentation of fructose, in the presence of the heterofermentative lactic bacteria, in order to promote the production of acetic acid and to obtain the desired content of that acid.

According to a particular embodiment, the leaven contains a rye flour as non malted grain flour and a malted wheat flour as malted grain flour, advantageously in a proportion of 8 to 12 parts of rye flour for one part of malted wheat flour.

It is possible that the process comprises one or several concentration steps with separation of the liquids, concentration of the liquids and reincorporation of the aromatic compounds in the concentrated phase.

In order to avoid any undesirable decantation phenomenon which could be detrimental to the conservation of the leaven when the liquid leaven is packaged in important volumes, the leaven is stabilized by means of a classic food grade stabilizing agent such as xanthane gum, or maintained with a gentle or slow stirring.

Another object of the invention is a leavened bread characterized by the fact that it was obtained by means of a direct process using a leaven according to the invention.

Preferably, the preparation of the leaven according to the invention is carried out as follows.

In a first step, a preparation of each of the selected lactic bacteria is produced by successive cultures carried out within conventional media which are classic for the multiplication of lactic bacteria. These cultures are performed in sterile fermentation equipments. The production within sterile fermentors following the lab stage is performed at a pH higher than 5, preferably at pH 6. The regulation of the pH is obtained using NaOH or any other base such as KOH.

Preferably, the sterile multiplication of the heterofermentative lactic bacteria is carried out using the so-called "fed-batch" technique and under aerobic conditions; the so-called "fed-batch" process, which can also be denoted by "discontinuous culture which is fed continuously", comprises discontinuous production of the lactic bacteria while the feeding of nutrient substances and especially of sugar (glucose) is continuous or fairly continuous. The "fed-batch" is carried out in such a way that the concentration of residual sugar within the culture medium is from 0.1 g/kg to 1 g/kg.

The proteinic raw materials, principally yeast extract, are introduced during the first part of the "fed-batch" cultivation or culture.

It is possible to carry out the multiplication of the homofermentative lactic bacteria in "fed-batch" under anaerobic or under aerobic conditions.

Preferably, if an aerobic production of acetic acid in the presence of xylose had not been foreseen and made, an excess of fructose is added at the end of the culture of the heterofermentative lactic bacteria or when preparing the leaven in order to promote the formation of acetic acid under anaerobic conditions at the beginning of the anaerobic fermentation of the leaven.

That use of fructose should preferably be carried out in the absence of yeast. In order to promote the production of acetic acid, it is possible to cumulate the use of xylose under aerobic conditions and the use of fructose under anaerobic conditions.

When only one strain of lactic bacteria is selected and multiplied, a strain of heterofermentative bacteria is chosen.

A heterofermentative lactic bacteria strain of the species *Lactobacillus brevis* corresponding to the above-defined selection criteria is, for example, the strain deposited with the Centre National de Culture de Microorganism, Institut Pasteur, 25 rue du Docteur Roux, 75724 Paris cedex 15, under the n° CNCM I-2002.

In the case whereby at least two lactic bacteria are separately selected and multiplied, preferably one of them is heterofermentative and the second one is homofermentative. Preferably, the homofermentative bacterium is selected among those of the species *Lactobacillus casei*. Still preferably, the leaven is seeded with the said second preparation of homofermentative bacteria after the phase of production of acetic acid by the heterofermentative bacteria.

In parallel, preparations of each of the selected yeast strains are carried out by means of conventional techniques for the cultivation of yeasts using preferably pure sugars, especially glucose, at least at the level of a "pied de cuve" or "starter foot of a tank" or "starter yeast preparation" enabling to have starter yeasts capable of seeding the leaven.

A yeast strain which can be used is the strain *Saccharomyces chevalieri* NCYC 935, which is available from the public collection of the National Collection of Yeast Cultures, Genetics and Microbiology Department, Institute of Food Research, Norwich Research Park Colney, Norwich NR4 7UA, United Kingdom.

These liquid preparations of microorganisms are used to seed the one or several non malted flours and preferably also the one or the several malted flours which were made into a paste with water in order to produce the liquid dough for the leaven.

Advantageously, the water which is necessary for making the paste is provided at least partially by the preparations of microorganisms.

The thus obtained leaven ferments anaerobically in a tank at about 30° C. during 20 to 30 hours until a baker's leaven or sourdough is obtained, the pH of which is measured directly in the leaven and which is stable during storage between 4 and 4.3, preferably between 4.1 and 4.3.

The process according to the invention for the preparation of the leaven according to the invention is characterized by the fact that it comprises the following steps:

selection of at least one strain of heterofermentative lactic bacteria, preferably of at least one strain of yeast and, preferably and possibly, of at least one strain of homofermentative lactic bacteria, separate multiplication of each strain of lactic bacteria, thus providing a first group of preparation(s) of microorganisms, possible separate multiplication of each yeast strain, thus providing a second group of preparation(s) of microorganisms, seeding, possibly at different moments, using the above-said preparation(s) of microorganisms, of a liquid dough obtained starting from water, from at least one non malted grain flour and preferably from at least one malted grain flour or any other equivalent source of amylases, the water being possibly the water comprised by the preparations of microorganisms, fermenting the thus obtained dough or leaven until the fermentable sugars are consumed, the said dough containing an amount of amylases sufficient for the degradation of the totality of the degradable starch of the flours into maltose and into glucose within a period of time which is compatible with the control of the process, conservation of the thus obtained dough at 4° C. while watching that no decantations detrimental to its conservation occur, it being understood that the thus defined process is conducted:

with determination and limitation of the direct and indirect introduction of fermentable sugars in such a way that the desired productions are obtained with the defined amounts which are compatible with the conservation of the leaven at the pH of the leaven, in such a way that the leaven thus obtained corresponds to a medium buffered at the desired pH.

The said process comprises consequently the following steps:

separate multiplication(s) under sterile conditions of each of the lactic bacteria strains in sterile fermentation conditions, possibly separate multiplication(s) of each yeast strain, seeding with each of the preparation(s) of microorganisms, possibly at different moments, of a liquid dough composed of flours and water, the water being possibly the water comprised by the preparations of microorganisms fermentation of the said liquid dough under anaerobic conditions in tank preferably during 20 to 30 hours at 30° C. in order to obtain a baker's leaven or sourdough the composition of which is defined by the parameters consisting of the revivable biomass of bacteria and of yeasts the amounts of lactic acid and acetic acid which are present and which in principle no longer change significantly the controlled and stable pH.

The process should be considered as a whole wherein it is necessary to control:

the different steps of the production of biomass, of lactic acid, of acetic acid and of alcohol in function:

of the sugars which are present and of the metabolism of each strain, of the competition between the different strains, the said competition being limited by the separate multiplication of each microorganism and said competition can also be limited by seeding the leaven with each preparation of microorganisms at different moments, the direct and the indirect introductions of fermentable sugars, the indirect introductions being under the form of enzymatically degradable starch comprised by the flours, in such a way that the desired productions of living biomass, lactic acid, acetic acid and possibly alcohol occur:

in the desired amount and remain limited to that amount, the regulation of the pH which must be effected upstream and which may lead to the introduction of an amount of total NaOH sufficient to bring the final pH to preferably either 4.2 or 4.3.

The leaven obtained at a pH of about 4.2 is buffered by the mixture of salts contained therein.

At that pH, a pH variation of 0.1 requires the production of about 3 g/kg of lactic acid or about 6 g/kg of acetic acid. After the moment at which the medium is exhausted and contains less than 1 g/kg of measurable fermentable sugars, the production of acids during conservation is lower than these quantities.

The two essential criteria for the control and mastering of the process according to the invention consist on the one hand of the knowledge and the limitation of the amount of fermentable sugars introduced directly or indirectly in such a way that the desired productions are obtained and, on the other hand, on the control of the pH by means of NaOH in order to obtain a medium which is buffered at the requested pH.

In this connection, numerous embodiments are possible.

For example, it is possible to forecast that the end of the fermentation of the leaven occurs at 4° C. during the conservation.

The leaven according to the invention which is obtainable by the process hereabove defined presents the following characteristic features, possibly after concentration:

- dry matter content: 12 to 50%, preferably 15 to 35%, and still more preferably 13 to 20%.
- stable pH from 4 to 4.3, preferably comprised between 4.1 and 4.3, the stability being ensured due to a buffering power such that the lowering of 0.1 pH corresponds to the introduction of at least 2 g/kg of lactic acid, preferably at least 3 g/kg of lactic acid.
- lactic acid content: 10 to 50 g/kg of leaven, preferably 10 to 30 g/kg of leaven, and more preferably 15 to 30 g/kg of leaven.
- acetic acid content: at least 2 g/kg of leaven, preferably from 7 to 15 g/kg of leaven, more preferably from 7 to 12 g/kg of leaven, and still more preferably from 6 to 10 g/kg of leaven.
- total content in acetic acid and in lactic acid lower than or equal to 52 g/kg, preferably lower than or equal to 40 g/kg, more preferably lower than or equal to 35 g/kg, and still more preferably lower than or equal to 30 g/kg.
- fermentable sugar content: $\leq 1\permil$ by weight of leaven.
- revivable yeast content: at least $1.10^6$, preferably $5.10^6$ cells, more preferably at least $8.10^6$ cells per gram and still more preferably at least $1.10^7$ cells per gram.
- revivable lactic bacteria content: at least $1.10^9$, preferably at least $3.10^9$ cells per gram and still more preferably at least $5.10^9$ cells per gram.
- duration of the stability of the product: at least 4 weeks at 10° C., preferably at least 6 weeks at 4° C. and still more preferably at least 2 months at 4° C.

The counting of the revivable lactic bacteria is carried out on gelose MRS (de Man, Rogosa and Sharpe) as disclosed in the Bergey's Manual of Systematic bacteriology, volume 2, 1986, according to a generally standardized method, in the presence of actidione (cycloheximid) to stop the growth of the yeasts.

The method which is preferably used is the one which is disclosed by the international standard ISO 13721-1995(F) "Meat and meat based products—Counting of lactic bacteria—Counting technique of colonies at 30° C.". The medium MRS which is used is the one marketed by SANOFI-PASTEUR. The dose of actidione is equal to 50 mg/liter. It is incorporated at the moment of the preparation of the Petri dishes.

If it is desired to differentiate the heterofermentative bacteria from the homofermentative bacteria which acidify the medium more quickly, the dye BCP (Bromo Cresol Pourpre) is used at the dose of 2 mg/liter of gelose based MRS.

The counting of the yeasts is effected on gelose YM (Yeast extract Malt) corresponding to the quality DIFCO® complemented with oxytetracycline at the dose of 100 mg/l for the inhibition of the growth of the bacteria according to a generally standardized method, the oxytetracycline being incorporated at the moment of the preparation of the Petri dishes.

In view of the well known uncertainties in counting microorganisms, these methods must be carefully optimized and each count must be repeated several times (at least 3 times) in order to obtain reliable results.

The thus obtained leaven, during the conservation times and at the temperature conditions above defined, enables making a leavened bread after 6 hours of fermentation of a dough seeded with the said leaven added at about 15% with respect to the flour used at the moment of kneading and with a maximum of 0.2% of the baker's yeast.

The present invention is illustrated by the non limiting following examples which relate to advantageous embodiments.

EXAMPLE 1

Preparation of the Leaven

A preparation of a strain *Lactobacillus brevis*, for example the strain CNCM I-2002, is obtained in sterile fermentors and under sterile conditions using the classical steps and processes, within the MRS type medium wherein the meat extract is substituted with yeast extract.

That preparation of the strain CNCM I-2002, after the necessary preculture steps, is carried out in "fed-batch", in aerobic conditions, at pH 6 until the moment at which $10^9$ bacteria cells per gram of liquid preparation are obtained. The regulation of the pH at the value of 6 is made by addition of a solution of NaOH. The "fed-batch" is conducted in such a way that the concentration of residual sugars (glucose and xylose) is comprised between 0.1 and 1 g/kg in the culture medium, except for possibly during the last hours of the culture during which the glucose contents may be higher.

The totality of the yeast extract is introduced during the first part of the culture. The multiplication rate of the biomass during the last hour of the culture is from 1.05 to 1.07.

In parallel, a *Saccharomyces cerevisiae chevalieri* yeast strain, for example the strain NCYC 935, is multiplied in such a way that a concentration of $10^8$ cells of yeast per gram is obtained, the culture processes used being the classic yeast culture processes.

Alternatively, it is possible to use a dry yeast obtained starting from the said strain by way of the conventional processes of the yeast industry, said dry yeast being rehydrated during several hours in a stirred medium rich in sugar. In practice, that process is the solution used to carry out this example.

100 kg of rye flour of the type 170, finely ground, are mixed with 10 kg of malted wheat flour, with 80 kg of preparation of yeasts NCYC 935 comprising $10^8$ cells per gram and 450 kg of the preparation of *Lactobacillus brevis* CNCM I-2002 comprising $10^9$ cells per gram.

This leaven phase is conducted in a stirred tank or fermentor under anaerobic conditions. The 640 kg of the mixture are maintained at 30° C. under stirring in order to reach a pH of 4.2, which pH is obtained within 18 to 24 hours.

This pH of 4.2 then remains practically constant during the conservation.

That preparation is quickly cooled to 4° C. and maintained at 4° C. during the whole duration of the conservation.

The process is carried out in such a way:

that the pH regulation during the multiplication phase of the lactic bacteria by the NaOH solution at pH 6 provides an introduction of sodium hydroxide sufficient, on the one hand, to obtain the pH of about 4.2 which is desired and, on the other hand, to constitute, together with the organic acids which are produced, the buffering power which is necessary, at the end of the production of the leaven; if that result is not obtained, a pH regulation comprising the addition of a NaOH solution is necessary at the beginning of the leaven phase, that a large excess of amylases is present for the exhaustion of the flours used during the leaven phase; it has been verified that an important introduction of fungal amylases to a sample of product taken off from the medium at the end of the leaven phase, and previously pasteurized, does not provide within two hours a measurable increase of the fermentable sugars, that the amounts of sugars which are introduced directly in the form of fermentable sugars or indirectly in the form of degradable starch, provide the desired amounts of lactic and acetic acid.

The characteristic features of the thus obtained leaven are:
dry matter content 15%;
pH (direct determination at 20° C.) 4.2;
lactic acid concentration 17 g/kg;
acetic acid concentration 8 g/kg;
ethanol concentration 13 g/kg;
a fermentable sugars ≦1 ‰;
the determination of these concentrations being carried out by HPLC (High Pressure Liquid Chromatography), or by way of enzymatic determinations which are known for the determination of glucose and fermentable maltose;

buffering power, defined as being the amount of lactic acid necessary to lower the pH by 0.1 point within the leaven . . . 3.3 g/kg;

buffering power, defined as being the amount of acetic acid necessary to lower the pH by 0.1 point within the leaven . . . 6.0 g/kg;

*Lactobacillus brevis* content . . . $6.10^9$ UFC per g;

*Saccharomyces cerevisiae chevalieri* content $1.10^7$ UFC per g;

it being understood that UFC (Unit Forming Colony) designates the number of cells which constitute a colony on a solid medium adapted for counting lactic bacteria on the one hand and for yeast on the other hand, as above indicated.

In order to avoid any decantation phenomenon, the thus obtained liquid leaven can be stabilized with about 0.3% of xanthane gum, or conserved under gentle or slow stirring.

Evolution of the Leaven During its Conservation

The evolution becomes apparent when examining the results collected in Table I, that is to say the values of pH and of the concentrations of Lactobacillus, of yeast, of lactic acid and of acetic acid at 4° C. at time zero, denoted T°, and at times zero plus 4, plus 6 and plus 9 weeks.

TABLE I

| | T° | T° + 4 weeks at 4° C. | T° + 6 weeks at 4° C. | T° + 9 weeks at 4° C. |
|---|---|---|---|---|
| Lactobacillus | $6.10^9$ UFC/g | $5.10^9$ UFC/g | $3.10^9$ UFC/g | $2.10^9$ UFC/g |
| Yeast | $1.10^7$ UFC/g | $1.10^7$ UFC/g | $9.10^6$ UFC/g | $8.10^6$ UFC/g |
| Lactic acid | 17 g/kg | 18 g/kg | 18 g/kg | 20 g/kg |
| Acetic acid | 8 g/kg | 8,3 g/kg | 8,5 g/kg | 8,5 g/kg |
| pH | 4.2 | 4.2 | 4.15 | 4.1 |

From the examination of the results collected in Table I, it appears that the leaven as obtained remains practically constant when conserved at 4° C. during 9 weeks.

EXAMPLE 2

Preparation of Leavened Breads

By way of a tasting test, comparison is made on breads prepared starting from different types of leavens, i.e.:

a leavened bread prepared using a traditional leaven "tout point" or ready-touse obtained from rye and introduced in an amount of 30 kg of leaven "tout point" into 100 kg of flour (bread 1);

a leavened bread prepared with a liquid leaven according to example 1 used in an amount of 15 kg of liquid leaven for 100 kg of flour (bread 2);

a bread prepared using a dehydrated, dry and inactive leaven in an amount of 3 kg for 100 kg of flour (bread 3), said latter leaven introducing only organic acids and aromatic molecules.

The proportions of leaven with respect to the flour in the case of breads 1 to 3 correspond to normally recommended amounts.

The formulas and the diagrams for the preparation of these breads are collected in Table II.

TABLE II

| | Bread 1 | Bread 2 | Bread 3 |
|---|---|---|---|
| wheat flour of the type 55 | 100 | 100 | 100 |
| water | 60 | 54 | 63 |
| salt | 2 | 2 | 2 |
| pressed yeast | 0.2 | 0.2 | 0.2 |
| liquid leaven ready-to-use | | 15 | |
| traditional leaven | 30 | | |
| inactive leaven | | | 3 |

The preparation process comprising six hours of fermentation is as follows:

First kneading: 8 minutes at the first speed on a spiral mixer kneading of trademark VMI®

Second kneading: 2 minutes at the second speed on the spiral mixer kneading of trademark VMI®

Bulk fermentation: 2 h 40 minutes with a folding at mid-duration

Division/Weighing: piece of dough of 500 g

Rest: 15 minutes

Moulding in form of French "bâstard" bread, i.e. in form of big "baguette" of 500 g Proofing: 3 hours Baking: 40 minutes at 235° C. with steam Determination of the Acids in the Crumb The contents in lactic acid and in acetic acid have been determined in the crumb of the breads prepared using the different leavens and are collected in Table III hereafter:

TABLE III

| | Bread 1 | Bread 2 | Bread 3 |
|---|---|---|---|
| Lactic acid | 4000 ppm | 2700 ppm | 3600 ppm |
| Acetic acid | 900 ppm | 1200 ppm | 150 ppm |

Tasting Test

The breads are also subjected to a tasting test carried out by a panel of experts; the results are collected in the following Table IV.

TABLE IV

| | Bread 1 | Bread 2 | Bread 3 |
|---|---|---|---|
| Type of leaven | traditional leaven | liquid leaven according to example 1 | dry and inactive leaven |

TABLE IV-continued

|  | Bread 1 | Bread 2 | Bread 3 |
|---|---|---|---|
| Aspect of the crust | nice aspect, crust colored without excess | nice aspect, color brown red little more important than with natural leaven | flat bread, colorless, lack of quality and of fermentation |
| Aspect of the crumb | crumb open to very open, color cream | open crumb, color cream | compact crumb, color grey |
| Smell of the crust | acetic taste without excess, boiled sugar, pinkish green | acetic taste, boiled sugar, caramel | burnt, earthy taste |
| Smell of the crumb | lightly acetic, woody, gingerbread | lightly acetic, gingerbread, green apple | burnt taste |
| Chewing | elastic and fondant | elastic and fondant | compressed, sticky |
| Taste | lightly sourish, almond, fruity, gingerbread | acetic without excess, gingerbread, fruity, coconut | clear acidity, metallic, without aromas |

Result of the Tasting Test of Breads Prepared with Different Types of Leaven

The unanimous conclusion of the tasting panel is that the liquid, ready-to-use, long conservation leaven provides a leavened bread which can advantageously be compared with a bread obtained using a traditional leaven, despite the fact that the bread obtained with the liquid leaven according to the invention presents a total acidity which is a little less.

It is furthermore remarkable that the ready-to-use leaven according to the invention is particularly interesting for use in baking processes called "in slow proof".

As a matter of fact, when used at a rate between 10 and 20% with respect to the flour and with 0.1% of baker's yeast, or even without any addition of baker's yeast, the ready-to-use leaven according to the invention permits to make fermentations of long duration from 12 to 24 hours at a temperature between 8 and 15° C. and to obtain the next day quickly and by way of minimal operations a leavened dough which is ready to be baked. The ready-to-use leaven according to the invention, when used in that technique of slow proof, enables the bakers to obtain leavened breads without working during the night.

EXAMPLE 3

A leaven was prepared according to the process of example 1, except for the fact that furthermore a preparation under sterile conditions of a strain of *Lactobacillus casei*, is produced by anaerobic "fed-batch". That preparation is separated from its culture medium and added at the hour 18 of the leaven phase in order to provide the leaven with $1.10^9$ UFC per g of *Lactobacillus casei*.

That addition at the end of leaven fermentation of a biomass of *Lactobacillus casei* is carried out in such a way that the growth or the acetic production of the heterofermentative lactic bacteria is not inhibited by the development of *Lactobacillus casei*. In practice, the characteristic features of the thus obtained leaven are unmodified except for the existence of that supplemental biomass.

Using that leaven, a bread is prepared according to the process of example 2 for bread 2, the characteristic features of which are as follows:

content in lactic acid 4300 ppm content in acetic acid 1200 ppm.

The thus obtained composition is identical to that of a bread obtained with traditional leaven.

What is claimed is:

1. Stable and ready-to-use sourdough baker's leaven adapted to ferment and to raise a baker's dough in a method for the production of sourdough bread by way of a direct process, which is a process comprising one kneading step, said baker's leaven being in the form of a liquid dough comprising at least one non malted grain flour, water, at least one preparation of heterofermentative lactic bacteria, lactic acid, acetic acid and residual fermentable sugars, wherein the said baker's leaven has a dry matter content from 12% to 50%, has a buffered pH from 4.0 to 4.3, contains at least 1 billion revivable lactic acid bacteria per gram, and contains a residual amount of fermentable sugars such that the amounts of lactic and acetic acids produced from said fermentable sugars by the said lactic bacteria do not drop the pH of the baker's leaven below 4.0, and wherein the baker's leaven has the following features during at least 4 weeks, provided it is maintained at a temperature lower than 10° C.:

it retains a pH from 4 to 4.3, it contains at least 1 billion revivable lactic bacteria per gram, and it is able to ferment and raise baker's dough, in a direct breadmaking process.

2. Baker's leaven according to claim 1, including a complement of amylases.

3. Baker's leaven according to claim 1, including at least one preparation of yeast.

4. Baker's leaven according to claim 1, including at least one preparation of homofermentative lactic bacteria.

5. Baker's leaven according to claim 1, wherein said dry matter content is comprised between 15% and 35%.

6. Baker's leaven according to claim 1, wherein said dry matter content is comprised between 13% and 20%.

7. Baker's leaven according to claim 1, wherein said pH is comprised between 4.1 and 4.3.

8. Baker's leaven according to claim 3, containing at least 1 million of revivable yeasts per gram during at least 4 weeks.

9. Baker's leaven according to claim 3, containing at least 5 millions of revivable yeasts per gram during at least 4 weeks.

10. Baker's leaven according to claim 1, wherein the said leaven maintains the said features, if it is maintained at a temperature of 4° C. during at least 6 weeks.

11. Baker's leaven according to claim 1, wherein the said leaven maintains the said features, if it is maintained at a temperature of 4° C. during at least 2 months.

12. Baker's leaven according to claim 1, containing a residual amount of fermentable sugars $\leq 1$ per 1000 by weight of leaven.

13. Baker's leaven according to claim 1, including lactic acid in an amount from 10 g to 50 g per kg of leaven.

14. Baker's leaven according to claim 1, including lactic acid in an amount from 10 g to 30 g per kg of leaven.

15. Baker's leaven according to claim 1, including lactic acid in an amount from 15 g to 30 g per kg of leaven.

16. Baker's leaven according to claim 1, including acetic acid in an amount from 2 g to 15 g per kg of leaven.

17. Baker's leaven according to claim 1, including acetic acid in an amount from 7 g to 15 g per kg or leaven.

18. Baker's leaven according to claim 1, including acetic acid in all amount from 7 g to 12 g per kg of leaven.

19. Baker's leaven according to claim 1, including acetic acid in an amount from 6 g to 10 g per kg of leaven.

20. Baker's leaven according to claim 1, including a mixture of acetic acid and of lactic acid wherein the ratio of acctic acid with respect to lactic acid is at least 30%, provided that the content in lactic acid is not higher than 30 g per kg of leaven.

21. Baker's leaven according to claim 1, wherein the sum of the amounts of lactic and of acetic acid is not higher than 52 g per kg of leaven.

22. Baker's leaven according to claim 1, wherein the sum of the amounts of lactic and of acetic acid is equal to or lower than 40 g per kg of leaven.

23. Baker's leaven according to claim 1, wherein the sum of the amounts of lactic and of acetic acid is lower than or equal to 35 g per kg of leaven.

24. Baker's leaven according to claim 1, wherein the sum of the amounts of lactic and acetic acid is lower than or equal to 30 g per kg of leaven.

25. Baker's leaven according to claim 1, wherein each kg of leaven includes
from 15 g to 30 g of lactic acid and from 7 g to 12 g of acetic acid.

26. Baker's leaven according to claim 1, wherein each kg of leaven includes
from 15 g to 30 g of lactic acid and
from 6 g to 10 g of acetic acid.

27. Baker's leaven according to claim 1, wherein said leaven has a buffering power such that the introduction of at least 2 g of lactic acid per kg of leaven is necessary to lower the pH of the leaven by 0.1.

28. Baker's leaven according to claim 1, wherein said leaven has a buffering power such that the introduction of at least 3 g of lactic acid per kg of leaven is necessary to lower the pH of the leaven by 0.1.

29. Baker's leaven according to claim 2, wherein in the process by which it is obtained the dough to be seeded comprises at least one malted grain flour providing a complement of amylases.

30. Stable and ready-to-use sourdough baker's leaven adapted to ferment and to raise a baker's dough in a method for the production of sourdough bread by way of a direct process, which is a process comprising one kneading step, said baker's leaven being in the form of a liquid dough comprising at least one non malted grain flour, water, at least one preparation of heterofermentative lactic bacteria, lactic acid, acetic acid and residual fermentable sugars, wherein the said baker's leaven has a dry matter content from 12% to 50%, has a buffered pH from 4 to 4.3, contains at least 1 billion of revivable lactic bacteria per gram, and contains a residual amount of fermentable sugars such that the amounts of lactic and acetic acids produced from said fermentable sugars by the said lactic bacteria do not drop the pH of the baker's leaven below 4.0, and wherein the baker's leaven has the following features during at least 4 weeks, provided it is maintained at a temperature lower than 10° C.:
it retains a pH from 4 to 4.3,
it contains at least 1 billion revivable lactic bacteria per gram, and
it is able to ferment and raise baker's dough in a direct breadmaking process,
said baker's leaven being obtained by way of a process comprising the following steps:
selection of at least one strain of heterofermentative lactic bacteria,
separate multiplication of each strain of lactic bacteria, thus providing a first group of preparation(s) of microorganisms,
seeding with the above said preparation(s) of microorganism(s) a dough obtained starting from water and at least one non malted grain flour, fermenting the thus obtained dough or leaven until consumption of all fermentable sugars, the said dough or leaven containing an amount of amylases sufficient for the degradation of the totality of the degradable starch into maltose and into glucose within a time which is compatible with the control of the process, and
conservation at 4° C. of the thus obtained dough which is stabilized by means of a food grade stabilizing agent or subjected to slow stirring;
the thus defined process being conducted:
with direct and indirect introduction of fermentable sugars so as to obtain productions of lactic and acetic acids in amounts which do not drop the pH of the leaven below 4.0, and
with buffering of the pH of the leaven between 4.0 and 4.3.

31. Baker's leaven according to claim 30, wherein the process by which it is obtained furthermore includes a step of selection of at least one strain of yeast and its separate multiplication providing a second group of preparation(s) of microorganisms.

32. Baker's leaven according to claim 30, wherein the process by which it is obtained comprises furthermore a step of selection of at least one strain of homofermentative lactic bacteria and its separate multiplication providing a second group of preparation of lactic bacteria.

33. Baker's leaven according to claim 30, wherein the process by which it is obtained includes a step of seeding the dough with the preparation(s) of microoganism(s) at different moments.

34. Baker's leaven according to claim 30, wherein in the process by which it is obtained the dough to be seeded comprises a complement of amylases.

35. Baker's leaven according to claim 30, wherein the heterofermentative lactic bacteria are selected from the group consisting of Lactobacillus, Leuconostoc and Pedioccocus.

36. Baker's leaven according to claim 30, wherein the heterofermentative lactic bacteria are selected from the group of *Lactobacillus brevis* strains.

37. Baker's leaven according to claim 30, wherein the heterofermentative lactic bacteria belong to the strain deposited at CNCM under the number I-2002.

38. Baker's leaven according to claim 30, wherein in the process by which it is obtained at least two strains of lactic bacteria are selected, multiplied and used to seed the said dough, one of them belonging to a heterofermentative lactic bacteria strain and another to a homofermentative lactic bacteria strain.

39. Baker's leaven according to claim 30, wherein in the process by which it is obtained at least two strains of lactic bacteria are selected, multiplied and used to seed the said dough, one of them belonging to a heterofermentative lactic bacteria strain and another to a homofermentative lactic bacteria strain belonging to the group consisting of *lactobacillus plantarum* strains and *lactobacillus casei* strains.

40. Baker's leaven according to claim 30, wherein in the process by which it is obtained, one strain of yeast is selected, multiplied and used to seed the said dough, the said yeast strain being not able to ferment maltose.

41. Baker's leaven according to claim 30, wherein in the process by which it is obtained, one strain of yeast is selected, multiplied and used to seed the said dough, the said yeast strain belonging to the subspecies *Sacchoromyces cerevitiae* Var. chevalieri.

42. Baker's leaven according to claim 30, wherein in the process by which it is obtained each preparation of lactic bacteria is carried out in sterile fermentors and under sterile conditions at a pH equal to or higher than 5 with regulation of the pH using a solution of NaOH.

43. Baker's leaven according to claim 30, wherein in the process by which it is obtained each preparation of lactic bacteria is carried out in "fed-batch" process consisting in a multiplication of lactic bacteria discontinuously with continuous introduction of sugar.

44. Baker's leaven according to claim 30, wherein in the process by which it is obtained each preparation of heterofermentative lactic bacteria is obtained under aerobic conditions.

45. Baker's leaven according to claim 30, wherein the process by which it is obtained comprises a step of fermentation of the fructose under anaerobic conditions and/or a step of fermentation of the xylose under aerobic conditions in the presence of the heterofermentative lactic bacteria.

46. Leavened bread, obtained according to a direct process by fermentation with a leaven according to claim 1.

47. Leavened bread, obtained according to a direct process comprising a slow proof step with a leaven according to claim 1.

48. Baker's leaven according to claim 29, wherein the non malted grain flour is a rye flour, the malted grain flour is a malted wheat flour, these flours being within a ratio of 8 to 12 parts of non malted rye flour per part of malted wheat flour.

\* \* \* \* \*